(12) United States Patent
Mikkola et al.

(10) Patent No.: US 11,000,790 B2
(45) Date of Patent: May 11, 2021

(54) DETACHABLE WEAR STRIP FOR USE IN THE VACUUM BELT FILTER DEVICE

(71) Applicant: OUTOTEC (FINLAND) OY, Espoo (FI)

(72) Inventors: Harri Mikkola, Lappeenranta (FI); Pekka Suihkonen, Lappeenranta (FI); Matti Luoma, Lappeenranta (FI)

(73) Assignee: OUTOTEC (FINLAND) OY, Espoo (FI)

(*) Notice: Subject to any disclaimer, the term of this patent is extended or adjusted under 35 U.S.C. 154(b) by 733 days.

(21) Appl. No.: 15/558,682

(22) PCT Filed: Mar. 23, 2016

(86) PCT No.: PCT/FI2016/050185
§ 371 (c)(1),
(2) Date: Sep. 15, 2017

(87) PCT Pub. No.: WO2016/151200
PCT Pub. Date: Sep. 29, 2016

(65) Prior Publication Data
US 2018/0111068 A1    Apr. 26, 2018

(30) Foreign Application Priority Data
Mar. 24, 2015  (FI) ...................... 20155202

(51) Int. Cl.
*B01D 33/04*    (2006.01)
*B01D 33/056*   (2006.01)

(52) U.S. Cl.
CPC ........... *B01D 33/056* (2013.01); *B01D 33/04* (2013.01)

(58) Field of Classification Search
CPC ............................. B01D 33/04; B01D 33/056
(Continued)

(56) References Cited

U.S. PATENT DOCUMENTS 2,377,252 A * 5/1945 Lehrecke ...................... 210/401
5,055,091 A  10/1991 Morris, Jr. et al.
(Continued)

FOREIGN PATENT DOCUMENTS

| EP | 0 172 013 A2 | 2/1986 |
| FR | 2 309 265 A1 | 11/1976 |
| GB | 2 064 974 A | 6/1981 |

OTHER PUBLICATIONS

Search Report issued by the Finnish Patent and Registration Office in relation to Finnish Application No. 20155202 dated Sep. 23, 2015 (1 page).
(Continued)

*Primary Examiner* — Thomas M Lithgow
(74) *Attorney, Agent, or Firm* — Robert P. Michal, Esq.; Carter, DeLuca & Farrell LLP

(57) ABSTRACT

A detachable wear strip for an endless seal belt of a vacuum belt filter device is configured to be arranged in a first groove of a guide part between the endless seal belt and the guide part, wherein the endless seal belt is configured to run in the first groove in contact with a low pressure side of an endless moving filter belt of the vacuum belt filter device, wherein the guide part being arranged between a vacuum box of a vacuum arrangement and the low pressure side, and wherein by the vacuum arrangement being configured to produce a suction at a low pressure side of the endless moving filter belt at a working zone of the vacuum belt filter device.

14 Claims, 5 Drawing Sheets

(58) Field of Classification Search
USPC .......................................... 210/400, 401, 783
See application file for complete search history.

(56) References Cited

U.S. PATENT DOCUMENTS

| 8,857,626 | B1* | 10/2014 | Breinholt | ............. | B01D 33/056 |
| | | | | | 210/401 |
| 10,279,286 | B2* | 5/2019 | Mikkola | .............. | B01D 33/056 |

OTHER PUBLICATIONS

International Search Report issued by the European Patent Office acting as the International Searching Authority in relation to International Patent Application No. PCT/FI2016/050185 dated Jun. 15, 2016 (3 pages).

Written Opinion of the International Searching Authority issued by the European Patent Office acting as the International Searching Authority in relation to International Patent Application No. PCT/FI2016/050185 dated Jun. 15, 2016 (6 pages).

International Preliminary Report on Patentability issued by the European Patent Office acting as the International Searching Authority in relation to International Patent Application No. PCT/FI2016/050185 dated Jun. 29, 2017 (7 pages).

Office Action issued by the Finnish Patent and Registration Office in relation to Finnish Application No. 20155202 dated Jan. 11, 2016 (6 pages).

An Abstract of South African publication ZA 8700975 A published by the South African Patent Office on Sep. 30, 1987; Applicant: RIX Construction Proprietary Limited Abstract Only—provided by the Finnish Patent and Registration Office.

An Extract of South African publication ZA 7806257 A published by the South African Patent Office on Jan. 30, 1980; Applicant: Etter M Extract Only—provided by the Finnish Patent & Registration Office as South African Patent Office no longer has document available.

* cited by examiner

DETACHABLE WEAR STRIP FOR USE IN THE VACUUM BELT FILTER DEVICE

CROSS-REFERENCE TO RELATED APPLICATIONS

This application is a National Phase Entry under 35 USC § 371 of PCT Patent Application Serial No. PCT/FI2016/050185 filed Mar. 23, 2016, which claims priority to Finnish Patent Application No. 20155202, filed Mar. 24, 2015, the disclosure of each of these applications is expressly incorporated herein by reference in their entirety.

FIELD OF THE INVENTION

The invention relates to a detachable wear strip for use in the vacuum belt filter device as defined in the preamble of independent claim 1.

OBJECTIVE OF THE INVENTION

The object of the invention is to provide a detachable wear strip for use in the vacuum belt filter device.

SHORT DESCRIPTION OF THE INVENTION

The detachable wear strip for use in the vacuum belt filter device is characterized by the definitions of independent claim 1.

Preferred embodiments of the detachable wear strip for use in the vacuum belt filter device are defined in the dependent claims 2 to 14.

The invention relates also to use of a detachable wear strip according to any of the claims 2 to 14 in a vacuum belt filter device

LIST OF FIGURES

Figure 1:
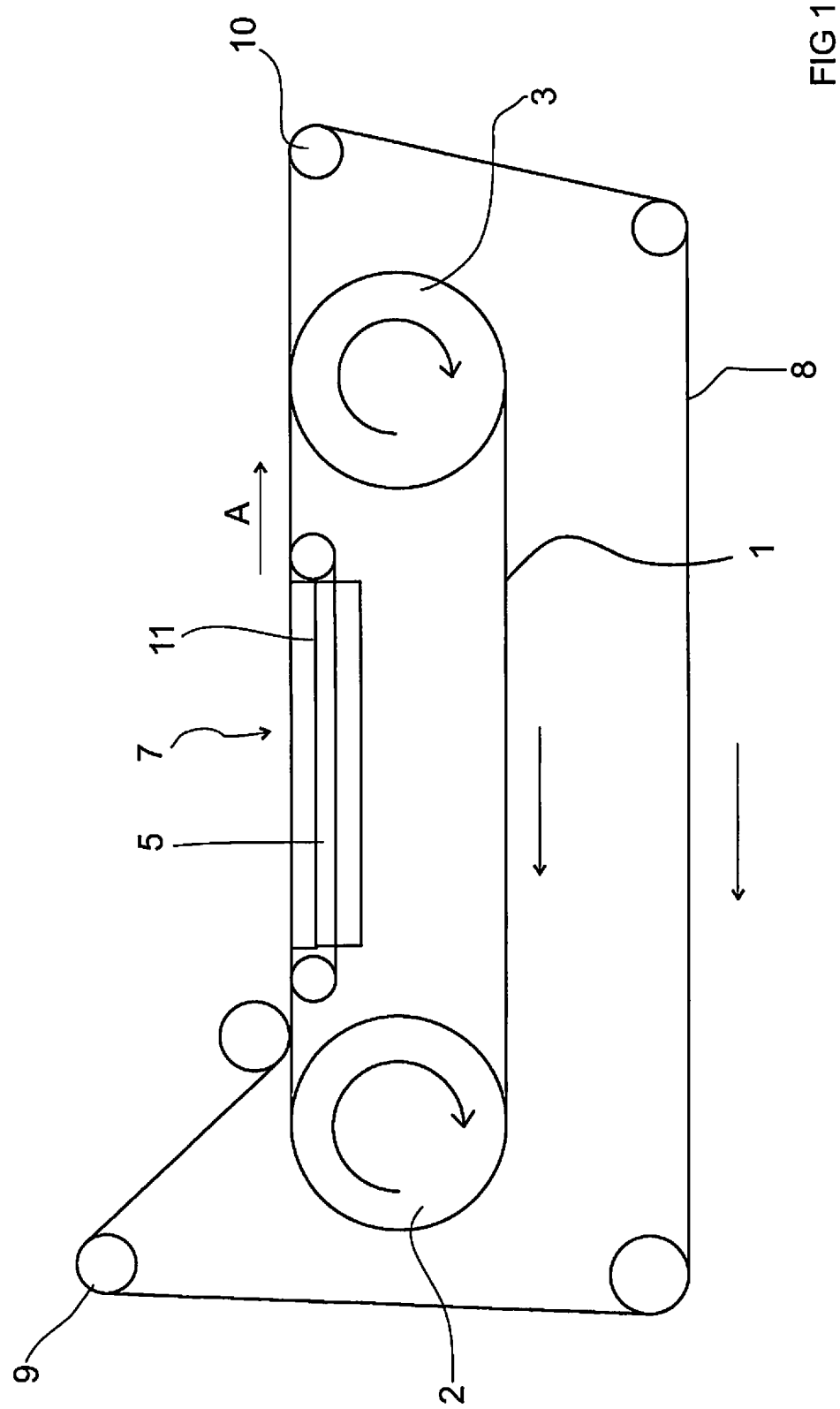
Figure 2:
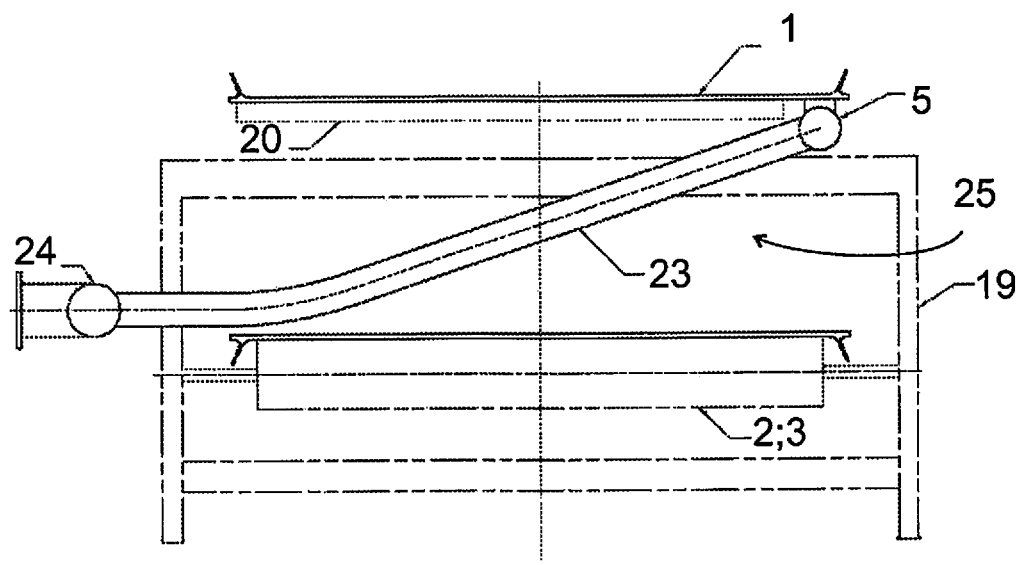
Figure 3:
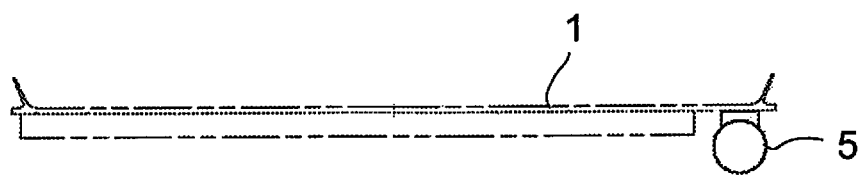
Figure 4:
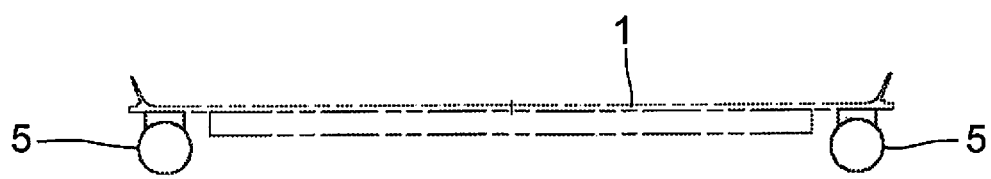
Figure 5:
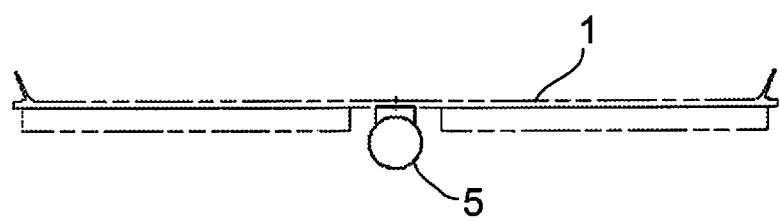
Figure 6:
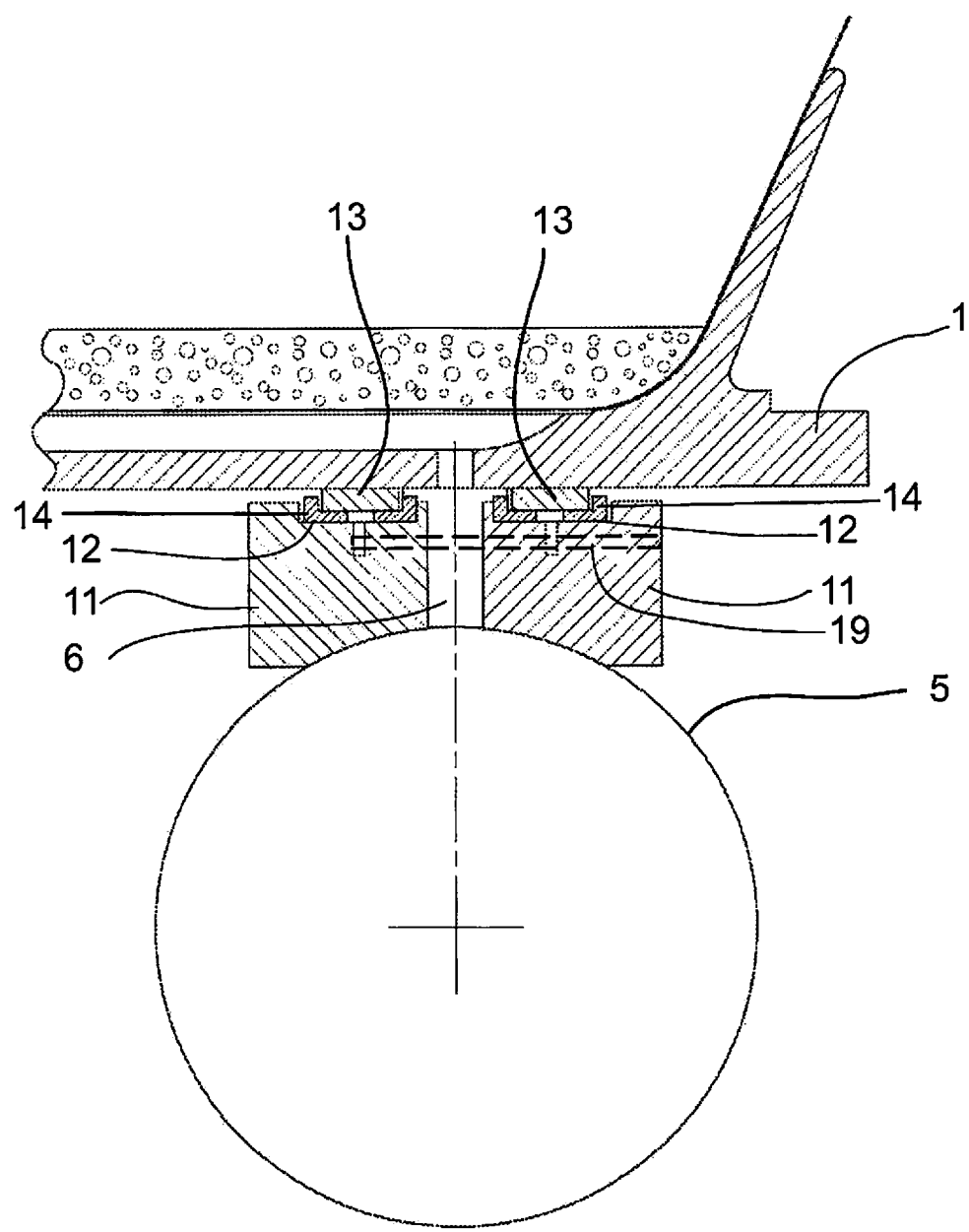
Figure 7:
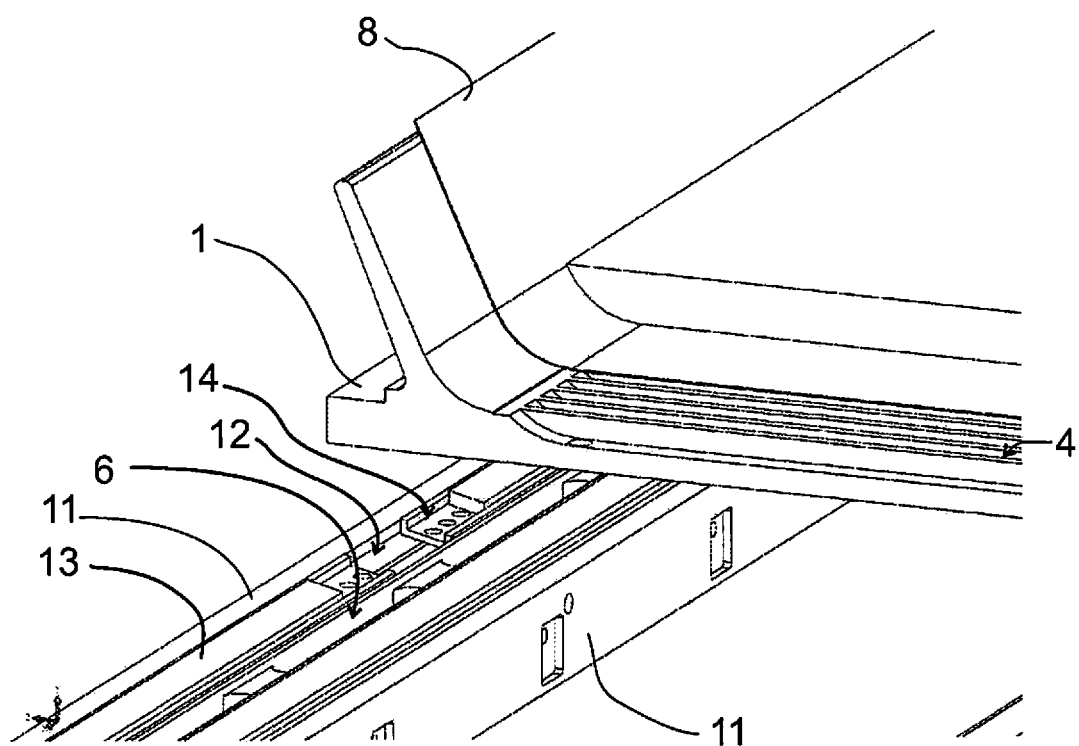
Figure 8:
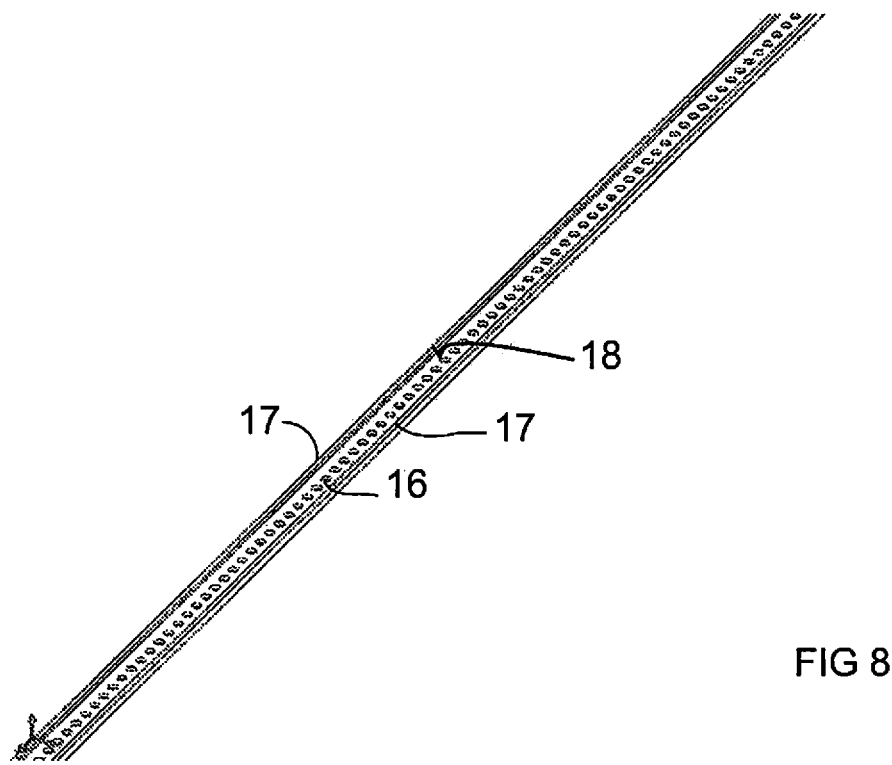
Figure 9:
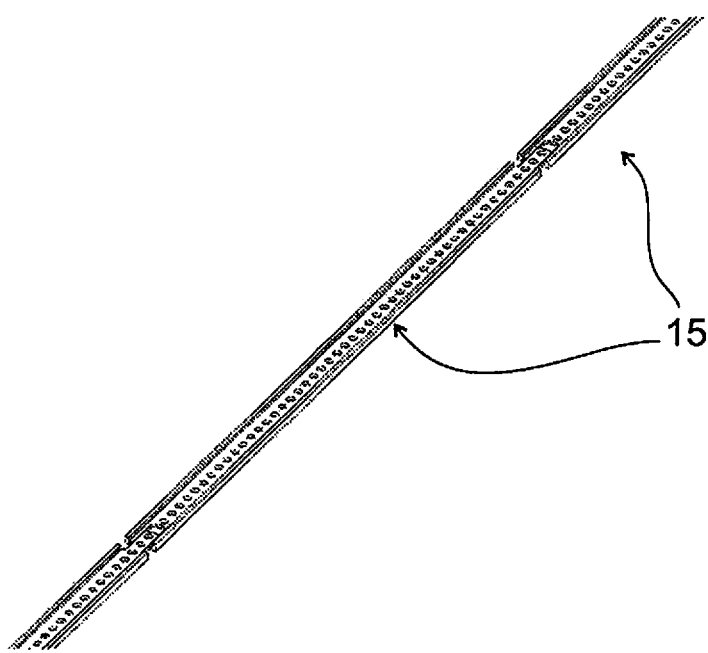

In the following the invention will described in more detail by referring to the figures, which FIG. 1 shows a vacuum belt filter device according to an embodiment, FIG. 2 shows in cut view a vacuum belt filter device according to another embodiment, FIG. 3 shows a detail of the vacuum belt filter device shown in FIG. 2, FIG. 4 shows a detail of the vacuum belt filter device shown in FIG. 2, FIG. 5 shows a detail of the vacuum belt filter device shown in FIG. 2, FIG. 6 shows in cut view a detail of the vacuum belt filter device, FIG. 7 shows in cut view a detail of the vacuum belt filter device, FIG. 8 shows a first embodiment of the wear strip, and FIG. 9 shows a second embodiment of the wear strip.

DETAILED DESCRIPTION OF THE INVENTION

In the following, the detachable wear strip for an endless seal belt 13 of a vacuum belt filter device and some embodiment and variants of the detachable wear strip will be described in greater detail.

The detachable wear strip 14 has an elongated base portion 16 having lateral side edges (not marked with a reference numeral) and longitudinal side flanges 17 at each lateral side edge so that a second groove 18 for the endless seal belt 13 is formed on the elongated base portion 16 between the longitudinal side flanges 17. The longitudinal side flanges 17 may be upstanding longitudinal flanges.

The detachable wear strip 14 is configured to be arranged, preferable immovable arranged during normal operation of the vacuum belt filter device, in a first groove 12 of a guide part 11 between the endless seal belt 13 and the guide part 11. The guide part 11 may comprise several guide part sections (not shown in the figures). The guide part 11 may be made of polymer, rubber, metal, ceramic or a combination of at least two of polymer, rubber, metal, and ceramic.

The guide part 11 may be an integral part of a vacuum box 5 of a vacuum arrangement 25 or a separate part of a vacuum box 5 of a vacuum arrangement 25 of the vacuum belt filter device. The vacuum arrangement 25 shown in FIG. 2 comprises also vacuum tubing 23 and a manifold arrangement 24.

The endless seal belt 13 may be configured to run in the second groove 18 of the detachable wear strip 14 in the moving direction A of an endless moving filter belt 1 of the vacuum belt filter device in contact with a low pressure side (not marked with a reference numeral) of the endless moving filter belt 1 of the vacuum belt filter device (not marked with a reference numeral). The endless moving filter belt 1 may have transversal grooves 4 on the high pressure side of the endless moving filter belt 1.

The endless moving filter belt 1 may be configured to revolve around at least a first roller 2 and a second roller 3.

The vacuum filter belt device may comprise an endless moving filter cloth 8, which may revolve around at least a third roller 9 and a fourth roller 10 and which is arranged in contact with a high pressure side of the endless moving filter belt 1 at the working zone 7 of the vacuum belt filter device.

In the vacuum filter belt device, the guide part 11 is arranged between the vacuum box 5 and the low pressure side of the endless moving filter belt 1.

In the vacuum filter belt device, the vacuum box 5 has suction openings 6, for example longitudinally arranged suction openings extending in the moving direction A of the endless moving filter belt 1. The vacuum arrangement 25 is configured to produce a suction at the low pressure side of the endless moving filter belt 1 at a working zone 7 of the vacuum belt filter device.

The detachable wear strip 14 may be perforated for allowing lubricating fluid and/or sealing such as water to flow through the detachable wear strip 14.

The elongated base portion 16 of the detachable wear strip 14 may be perforated so that the perforations form openings in the elongated base portion 16 of the detachable wear strip 14.

If the elongated base portion 16 of the detachable wear strip 14 comprises openings, the total cross-section area of the openings may be between 1 and 50%, preferably between 5 and 30%, more preferable between 7 and 20%, even more preferable between 8 and 15% of the area of the area of the elongated base portion 16.

If the elongated base portion 16 of the detachable wear strip 14 comprises openings, each opening may have a cross-section area between 5 mm$^2$ and 800 mm$^2$, preferably between 20 mm$^2$ and 500 mm$^2$, more preferably between 50 mm$^2$ and 300 mm$^2$ such as 200 mm$^2$.

The detachable wear strip 14 may comprise a plurality of wear strip parts 15 releasable connected together to form the detachable wear strip 14, as shown in FIG. 9. Alternatively, the detachable wear strip 14 may be being in one-part form, as shown in FIG. 8.

The detachable wear strip 14 may be made of at least one of the following: polymer, to metal, or ceramic.

The detachable wear strip 14 may have a width between 25 mm and 60 mm, preferably between 35 mm and 45 mm, more preferably between 39 mm and 43 mm, such as 41 mm.

The detachable wear strip 14 may have a thickness between 2 mm and 7 mm, preferably between 3 mm and 6 mm, more preferably between 4 mm and 5 mm.

The depth of the second groove 18 may be between 2 mm and 11 mm, preferably between 3 mm and 8 mm, more preferably between 4 mm and 6 mm, such as 5 mm.

The vacuum filter belt device may comprise guide 19, a filtrate manifold 22 and a filtrate hose 21 between the vacuum box 5 and the filtrate manifold 22, and a belt support 20 for supporting the endless moving filter belt 1. The detachable wear strip 14 is preferably, but not necessarily, configured to be arranged in a first groove 12 of a guide part 11 between the endless seal belt 13 and the guide part 11, wherein the guide part 11 is a separate part of the vacuum box 5 and is attached to a vacuum box 5 of a vacuum arrangement 25 of the vacuum belt filter device, and wherein the guide part 11 is located between the vacuum box 3 and the endless seal belt 13, and the thickness of the elongated base portion 16 of the detachable wear strip 14 is preferably, but not necessarily, smaller than the thickness of the guide part 11. The thickness of the elongated base portion 16 of the detachable wear strip 14 can for example be between 5 and 15% of the thickness of the guide part 11.

The invention relates also to the use of a detachable wear strip 14 in a vacuum belt filter device having an endless moving filter belt 1, a vacuum arrangement 25 having a vacuum box 5 comprising suction openings 6 and which vacuum arrangement 25 is configured to produce a suction at a low pressure side of the endless moving filter belt 1 at a working zone 7 of the vacuum belt filter device, a guide part 11 on opposite sides of the suction openings 6 of the vacuum box 5, wherein each guide part 11 is arranged between the vacuum box 5 and the low pressure side of the endless moving filter belt 1, and wherein each guide part 11 has a first groove 12 extending in the moving direction A of the endless moving filter belt 1, and an endless seal belt 13 configured to run in the first groove 12 of each guide part 11 in the moving direction A of the endless moving filter belt 1 in contact with the low pressure side of the endless moving filter belt 1, by arranging a detachable wear strip 14 in the first groove 12 of each guide part 11 between the endless seal belt 13 and the guide part 11. The guide parts 11 on opposite sides of the suction opening 6, between the vacuum box 5 and the low pressure side of the endless moving filter belt 1 may be integral parts of a guide member (not shown in the figures).

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A detachable wear strip for an endless seal belt of a vacuum belt filter device, comprising:
    an elongated base portion having lateral side edges and longitudinal side flanges at each lateral side edge so that a second groove for the endless seal belt is formed on the elongated base portion between the longitudinal side flanges, and
    the detachable wear strip being configured to be arranged in a first groove of a guide part between the endless seal belt and the guide part,
    the elongated base portion of the detachable wear strip being perforated so that the perforations form openings for allowing lubricating fluid and/or sealing fluid such as water to flow through the detachable wear strip,
    the total cross-section area of the openings being between 7 and 20% of the area of the area of the elongated base portion, and
    each opening have a cross-section area between 50 mm$^2$ and 300 mm$^2$.

2. The detachable wear strip according to claim 1, wherein
    the endless seal belt being configured to run in the second groove of the detachable wear strip in a moving direction of an endless moving filter belt in contact with a low pressure side of an endless moving filter belt of the vacuum belt filter device,
    by the guide part being arranged between a vacuum box of a vacuum arrangement and the low pressure side of the endless moving filter belt,
    by the vacuum box comprises suction openings,
    by the vacuum arrangement being configured to produce a suction at a low pressure side of the endless moving filter belt at a working zone of the vacuum belt filter device.

3. The detachable wear strip according to claim 1, wherein the elongated base portion being perforated so that the perforations form circular openings in the elongated base portion.

4. The detachable wear strip according to claim 1, wherein the total cross-section area of the openings being between 8 and 15% of the area of the area of the elongated base portion.

5. The detachable wear strip according to claim 1, wherein each opening have a cross-section area of 200 mm$^2$.

6. The detachable wear strip according to claim 1, wherein the detachable wear strip comprising a plurality of wear strip parts releasable connected together to form the detachable wear strip.

7. The detachable wear strip according to claim 1, wherein the detachable wear strip being one-part form.

8. The detachable wear strip according to claim 1, wherein the detachable wear strip being made of at least one of the following: polymer, metal or ceramic.

9. The detachable wear strip according to claim 1, wherein the detachable wear strip having a width between 25 mm and 60 mm, optionally between 35 mm and 45 mm, and optionally between 39 mm and 43 mm, and optionally equal to 41 mm.

10. The detachable wear strip according to claim 1, wherein the detachable wear strip thickness is between 2 mm and 7 mm, optionally between 3 mm and 6 mm, optionally between 4 mm and 5 mm.

11. The detachable wear strip according to claim 1, wherein the depth of the second groove being between 2 mm and 11 mm, optionally between 3 mm and 8 mm, and optionally between 4 mm and 6 mm, and optionally equal to 5 mm.

12. The detachable wear strip according to claim 1, wherein
    the detachable wear strip being configured to be arranged in the first groove of a guide part between the endless seal belt and the guide part, wherein the guide part is a separate part of the vacuum box and is attached to a vacuum box of a vacuum arrangement of the vacuum belt filter device, and wherein the guide part is located between the vacuum box and the endless seal belt, and the thickness of the elongated base portion of the detachable wear strip being smaller than the thickness of the guide part.

13. The detachable wear strip according to claim 1, wherein
the thickness of the elongated base portion of the detachable wear strip being between 5 and 15% of the thickness of the guide part.

14. A method of using the detachable wear strip of claim 1, wherein a vacuum belt filter device comprises:
an endless moving filter belt,
a vacuum arrangement, which comprises a vacuum box having suction openings and which is configured to produce a suction at a low pressure side of the endless moving filter belt at a working zone of the vacuum belt filter device,
a guide part on opposite sides of the suction openings of the vacuum box, wherein each guide part is arranged between the vacuum box and the low pressure side of the endless moving filter belt, and wherein each guide part has a first groove extending in the moving direction A of the endless moving filter belt,
an endless seal belt configured to run in the first groove of each guide part in the moving direction A of the endless moving filter belt in contact with the low pressure side of the endless moving filter belt, and
by arranging the detachable wear strip of claim 1 in the first groove of each guide part between the endless seal belt and the guide part.

* * * * *